G. J. CARNEY.
Nut-Lock.

No. 197,923. Patented Dec. 11, 1877.

Attest
Laurier Martin
Fredric Saylor

Inventor
George J. Carney

UNITED STATES PATENT OFFICE.

GEORGE J. CARNEY, OF LOWELL, MASSACHUSETTS.

IMPROVEMENT IN NUT-LOCKS.

Specification forming part of Letters Patent No. 197,923, dated December 11, 1877; application filed October 29, 1877.

*To all whom it may concern:*

Be it known that I, GEORGE J. CARNEY, of the city of Lowell, in the county of Middlesex and State of Massachusetts, have invented certain new and useful Improvements in Bolts, Washers, and Nuts; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
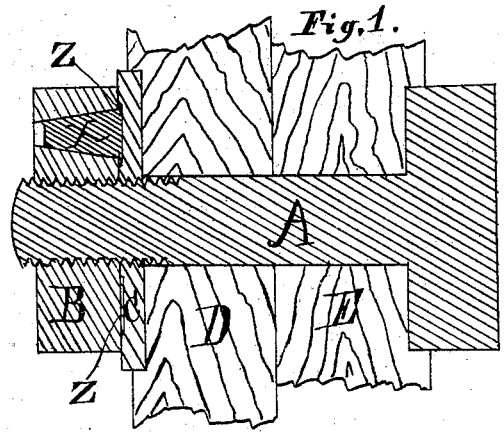
Figure 4:
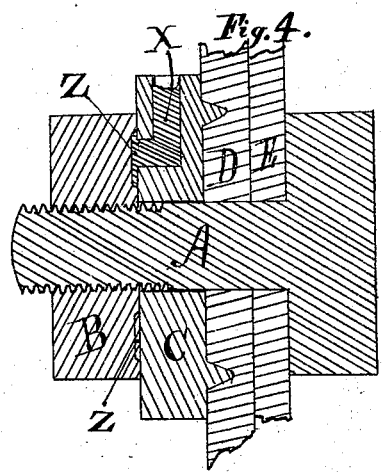
Figure 2:
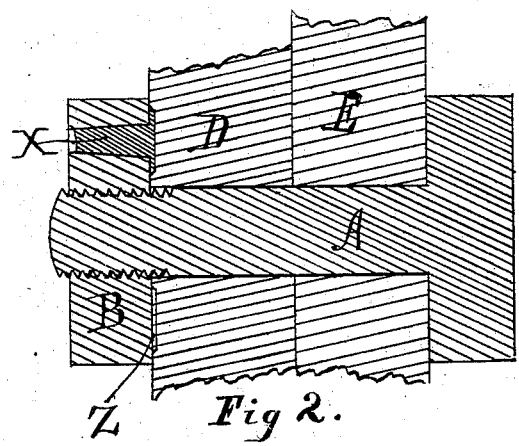
Figure 5:
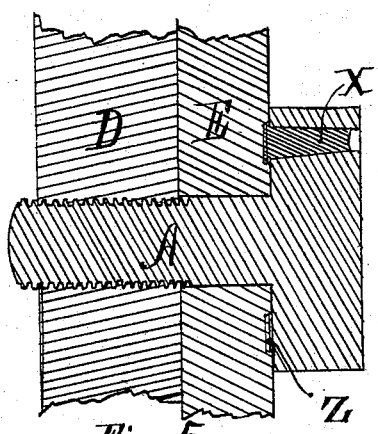
Figure 3:
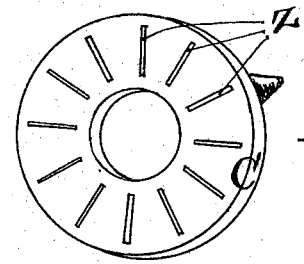

Figure 1 is a cross-section of one of my bolts, nut, and washer, showing two pieces of wood bolted together, and the nut fixed by my metal plug, so that it cannot turn and become loose. Fig. 2 is a cross-section, showing two pieces of metal bolted together; my nut and soft-metal plug is used, but the washer is dispensed with. Fig. 3 shows one of my washers, with indentations and projections on the back face to prevent its turning. Fig. 4 is one of my nuts and bolt shown in cross-section, with a different arrangement of plug shown in washer and nut-face indented. Fig. 5 is a cross-section of one of my bolts, with the plug shown in the head of the bolt.

The object of my invention is to furnish a device by which a nut may be fastened so that neither bolt nor nut, as the case may be, shall turn accidentally and become loose.

In the drawings, the A's are the bolts; the X's are holes filled with soft metal; the Z's are notches; the B's are nuts; the C's are washers; the D's and E's are pieces bolted together.

In all the figures like letters refer to like parts.

In Fig. 1 I have shown two pieces of wood bolted together. The head of the bolt A is shown as square, and is sunken into the wood. The washer is also square, and is sunken into the wood. The outer face of the washer is roughened, by chisel-cuts or otherwise, and the nut B has a taper hole, X, filled with a soft metal capable of being flowed or squeezed by pressure or expansion into the roughened face of the washer C. When the nut B is screwed up to its proper bearing, or the desired bearing on the face of the washer C, a punch is driven into the soft metal in the hole X, which is thus upset or flowed into the roughened face of the washer C, thus preventing the nut from turning by accident; but if it is desired to turn the nut, all that is necessary is to apply a wrench and turn it off, thus rubbing off the soft metal engaging the indentations or roughened face of the washer. The soft metal remains in the hole, and is ready to be used again and again, if it should be necessary to remove and refasten the nut, by simply expanding or flowing it, by the use of a punch, through into the hole X. This can of course be repeated an indefinite number of times without refilling the taper hole X with new metal. I use a mixture of tin and lead, though other metals may serve the same purpose.

In Fig. 2 I have shown two pieces of metal united by one of my bolts. A washer is dispensed with, and the face of the bar D has been cut with a cold-chisel, and thus a roughened or indented surface was made under the nut, so that the expanded soft metal in the hole X might engage the cuts or notches Z, and thus prevent the bolt turning.

In Fig. 3 I have shown a washer with a little teat or projection on its back face, to prevent its turning when brought against the face of the surface to which it may be applied, which is prepared with a hole to receive the little teat. One or more of these teats can be used, or the washer may be fastened in any suitable manner, by screws or otherwise. The front face of the washer is roughened, so as to admit parts of the soft metal to be expanded or driven into the indentations.

In Fig. 4 I show a washer which has the hole X for the soft metal in its face and edge. There are places where this form would be very useful. It will be evident that when the nut is screwed up and the metal in X is swaged into the indentations, Z, prepared for it, the nut will not turn of itself, but can be turned at will by the exhibition of force.

I do not confine myself to the application of my invention to nuts alone, but in Fig. 5 I have shown it as applied to the bolt-head, and in Fig. 4 through the washer and nut, and I could obviously apply it in Fig. 4 to both nut and the surface D, if the hole X had been also drilled through the side next D. There might arise a case where it could be applied by placing the soft metal in the material to be bolted, underneath the bolt-head or nut, and in that case the bolt-head or nut would be roughened or hacked with a cold-chisel, so that the soft metal could be expanded into it.

Having described my invention, what I claim as new, and desire to secure by Letters Patent, is—

In combination with a notched or serrated seat, a bolt, washer, or nut provided with a hole, extending through it and filled with soft metal, adapted to be driven into the notches or serrations, to lock the bolt, washer, or nut thereto, substantially as and for the purpose set forth.

In testimony that I claim the foregoing as my own I affix my signature in presence of two witnesses.

GEORGE J. CARNEY.

Witnesses:
LAURIN MARTIN,
FREDERIC TAYLOR.